(12) United States Patent
Bair et al.

(10) Patent No.: US 11,952,866 B1
(45) Date of Patent: Apr. 9, 2024

(54) GUIDELESS CAGE FOR DOWNHOLE VALVE

(71) Applicant: Black Gold Pump and Supply, Inc., Signal Hill, CA (US)

(72) Inventors: Michael Bair, Los Angeles, CA (US); Simon Shin, Los Angeles, CA (US)

(73) Assignee: Black Gold Pump and Supply, Inc., Signal Hill, CA (US)

( * ) Notice: Subject to any disclaimer, the term of this patent is extended or adjusted under 35 U.S.C. 154(b) by 31 days.

(21) Appl. No.: 17/955,374

(22) Filed: Sep. 28, 2022

(51) Int. Cl.
*E21B 34/06* (2006.01)
*E21B 34/14* (2006.01)
*F16K 15/04* (2006.01)

(52) U.S. Cl.
CPC ............ *E21B 34/142* (2020.05); *F16K 15/04* (2013.01); *E21B 2200/04* (2020.05)

(58) Field of Classification Search
CPC .... E21B 34/06; E21B 43/127; E21B 2200/04; F16K 15/04
See application file for complete search history.

(56) References Cited

U.S. PATENT DOCUMENTS

| | | | | |
|---|---|---|---|---|
| 1,214,400 A | * | 1/1917 | Wigle | F16K 15/04 |
| | | | | 417/570 |
| 1,706,593 A | * | 3/1929 | Sargent | F16K 15/04 |
| | | | | 137/533.13 |
| 2,005,299 A | * | 6/1935 | Penrod | F04B 53/10 |
| | | | | 137/533.15 |
| 5,297,579 A | | 3/1994 | McConnell et al. | |
| 5,593,292 A | * | 1/1997 | Ivey | F04B 53/101 |
| | | | | 137/533.15 |
| 5,992,452 A | | 11/1999 | Nelson, II | |
| 6,007,314 A | | 12/1999 | Nelson, II | |
| 6,283,148 B1 | * | 9/2001 | Spears | F04B 53/1005 |
| | | | | 251/126 |
| 7,069,997 B2 | | 7/2006 | Coyes et al. | |
| 8,453,673 B2 | | 6/2013 | Ford | |
| 10,184,314 B1 | * | 1/2019 | Bair | E21B 34/06 |
| 10,364,658 B2 | | 7/2019 | Michel | |
| 10,914,148 B2 | | 2/2021 | Rich | |
| 11,091,980 B2 | * | 8/2021 | Stachowiak, Jr. | F04B 53/1007 |
| 11,125,349 B1 | | 9/2021 | Samayamantula | |
| 2019/0032446 A1 | | 1/2019 | Gronning | |

* cited by examiner

*Primary Examiner* — Matthew R Buck
(74) *Attorney, Agent, or Firm* — James M. Duncan; Scanlon Duncan LLP

(57) ABSTRACT

A cage for a down-hole valve for a hydrocarbon well has no internal guides for directing a ball as it travels from a closed position in which the ball is disposed against a ball seat to an open position where the ball is urged against a ball stop structure. The cage has an internal conical profile which inhibits ball sticking, reduces ball lift acceleration, and allows for a full-open flow area through the cage.

13 Claims, 3 Drawing Sheets

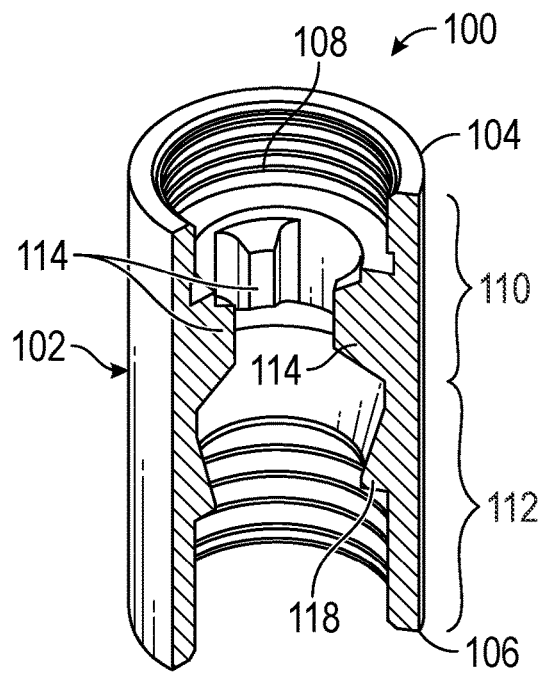
FIG. 1
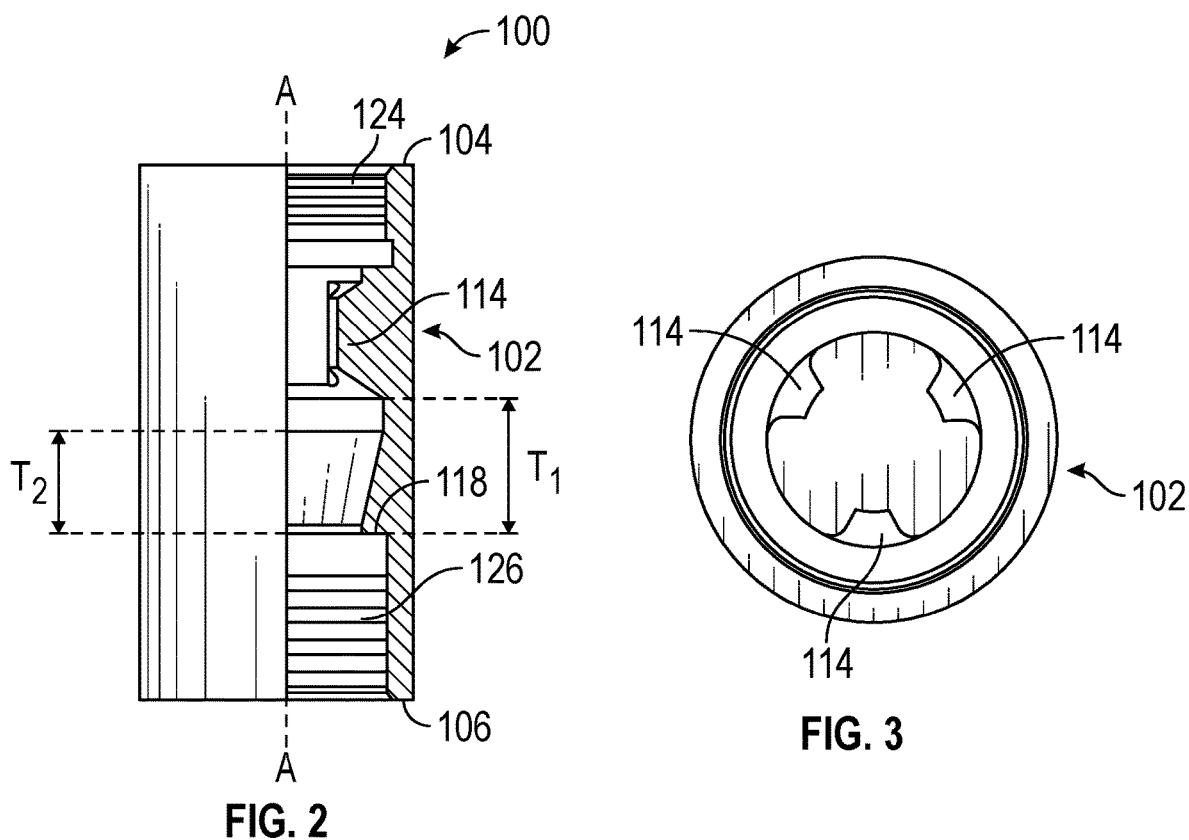
FIG. 2
FIG. 3

GUIDELESS CAGE FOR DOWNHOLE VALVE

BACKGROUND OF THE INVENTION

The present invention generally pertains to downhole oilfield production equipment. It more specifically refers to ball valves and ball cages used for downhole oilfield production, testing, and maintenance equipment.

Downhole ball and seat valves are utilized in a variety of oilfield applications. A common application is with downhole positive displacement pumps, where the pump has a standing valve and a traveling valve. However, in addition to use in downhole pumps, downhole ball and seat valves have other applications in oilfield service, such as downhole tool operation of various tools, including packers, washers and drill stem test tools. Downhole pumps and the aforementioned downhole devices are hereinafter collectively referred to as "downhole valves".

Using downhole pumps as a specific application, a downhole oilfield pump typically utilizes a standing valve and a traveling valve. In the general application, the standing valve is utilized with the pump barrel to allow fluid to flow into the barrel during an upstroke where the plunger is pulled upward through the barrel, and to prevent fluid from being displaced from the barrel when the plunger descends through the barrel. The traveling valve is utilized with the plunger, where the valve opens on the downstroke as the plunger descends through the fluid in the barrel and closes on the upstroke as the plunger rises lifting the fluid.

Ball and seat valves have the following general structure: (1) a cylindrical tubular cage forming a through-bore; (2) an annular seat extending perpendicularly across the bore, typically at its lower end; (3) a ball positioned within the bore of the cage; (4) a transverse ball stop extending across the upper end of the bore to limit the travel of the ball; (5) inwardly facing rib structures—known as ball guides—are integral to the cage and guide the ball as it travels in the cage between the annular seat and the ball stop and (6) a cylindrical shell which houses the cage, seat, ball, ball stop and ball guides.

In the case of downhole pump valves, fluid exits upwardly around the ball and through the upper end of the bore and out of the shell into the tubing. The valves utilized with downhole pumps are typically subjected to prolonged or continuous operation with the opening/closing sequence occurring thousands of times in a single day. These pumps are frequently operated in a corrosive environment, pumping a fluid which may include abrasive solids. The repeated reciprocation of the pump naturally results in wear and tear to the pump and valve components. For example, the impact of the ball on the interior of the valve cage and on the valve seat can result in damage to flow and sealing surfaces. Solids carried in the produced fluid can pack off inside the valve creating failure, reduced flow, or valve sticking.

It has been known to use ball guides in prior art valves to help the ball travel to the ball stop without allowing the ball to rattle too much inside the cage, thereby causing damage to the ball or valve seat. However, the clearance between the ball and the guides can be quite tight. Trash and/or sand can get wedged between the ball and guide, preventing the ball from returning to the seat and resulting in a pump malfunction. The known cages have flow rate ratios which promote turbulent flow in the cage resulting in chaotic ball movement and beating out of the cage. These problems can be exacerbated by restrictions in the valve cage from ball guides.

The existing ball guides may be hardlined to prevent the ball guides from being beaten out by the repeated impacts of the ball against the guide, which will eventually result in pump failure. However, the hardline tends to chip, which may result in loose chips becoming caught in the pump components and impacting the operation of the pump.

It is desirable to have a downhole ball and seat valve which limits internal flow restrictions while also reducing ball lift acceleration, sticking, and minimizing packing off of the interior of the valve with solids carried in the produced fluid.

SUMMARY OF THE INVENTION

Embodiments of the present valve cage do not have any internal guides which are present in the known valve cages. Instead of internal guides, embodiments of the present valve cage utilize an internal conical configuration. The conical configuration of the cage interior presently disclosed valve cage promotes laminar flow as the ball travels upwards. The structural configuration also provides a "nozzle effect" which helps the ball return to the seat. The conical geometry of the interior of the presently disclosed valve cage at progressively increases in flow area as the ball travels to the ball stop. The conical configuration and the ball travel distance are designed that flow around the ball is as laminar as possible to prevent violent ball movement.

An embodiment of the presently disclosed guideless valve cage has a cylindrical mandrel having an upper end and a lower end, wherein a longitudinal axis is defined there between. An axial bore extends from the upper end to the lower end. The axial bore has an upper section and a lower section. A ball stop structure is disposed in the upper section of the axial bore to stop the travel of the ball. The ball stop structure extends radially inward into the axial bore. The ball stop structure may have a downwardly facing shoulder having a sloping surface which engages and stops an upwardly traveling ball. The downwardly facing shoulder provides an undercut geometry which allows for a full flow area around the ball. An inwardly facing valve seat shoulder may be disposed within the lower section. A seat plug may be attached to the lower end. A valve seat may be disposed between the valve seat shoulder and the seat plug, where the valve seat has a sealing surface which is sealed when the ball sits on the valve seat.

A ball travel section is defined within the axial bore, where the ball travel section extends downwardly from the ball stop structure to the valve seat shoulder. The ball travel section has a first diameter downwardly adjacent the ball stop structure and a second diameter upwardly adjacent the valve seat shoulder, where the first diameter is larger than the second diameter. A transition section extends from the first diameter to the second diameter, where the transition diameter decreases linearly between the first diameter to the second diameter. In other words, the ball travel section has a conical profile. There are no intervening structural features in the transition section, thereby providing a full-open flow area through the cage. A ball may be disposed in the ball travel section.

The above-described configuration allows the spacing between the ball stop structure and the valve seat to be minimized, which minimizes ball lift when the valve is in the open position. This configuration reduces ball impact onto the cage and may eliminate the need for hard lining of the interior of the cage. When the valve is in the closed position, with the ball disposed on the seat, the inside geometry alleviates cage pack-off and ball sticking due to solids and provides a cavity between the side of the ball and the transition section which allows solids to settle below the ball.

BRIEF DESCRIPTION OF THE DRAWINGS

FIG. 1 shows a perspective quarter-sectioned view of an embodiment of the disclosed guideless valve cage.

FIG. 2 shows a front quarter-sectioned view of the guideless valve cage depicted in FIG. 1.

FIG. 3 shows a top view of an embodiment of the guideless valve cage.

DETAILED DESCRIPTION OF THE INVENTION

Referring now to the Figures, FIGS. 1 and 2 show quarter-sectioned views of an embodiment of the disclosed guideless valve cage 100. The guideless valve cage 100 comprises a mandrel 102 having an upper end 104 and a lower end 106, with a longitudinal axis A defined there between. It is to be appreciated that in directionally drilled hydrocarbon wells, there are portions of the well which may approach a horizontal orientation. Therefore, it is noted that the terms "upper", "lower", "updwardly", "downwardly", and other terms pertaining to elevation or spatial relation, are used herein with respect to the orientation of the guideless valve cage 100 in the well. For example, the term "upper" refers to an end of the guideless valve cage 100 generally oriented toward the ground surface and the term "lower" referring to an end generally oriented toward the bottom of the well, but the use of these terms are not intended to limit use of the invention to generally vertical operations.

Figure 5:
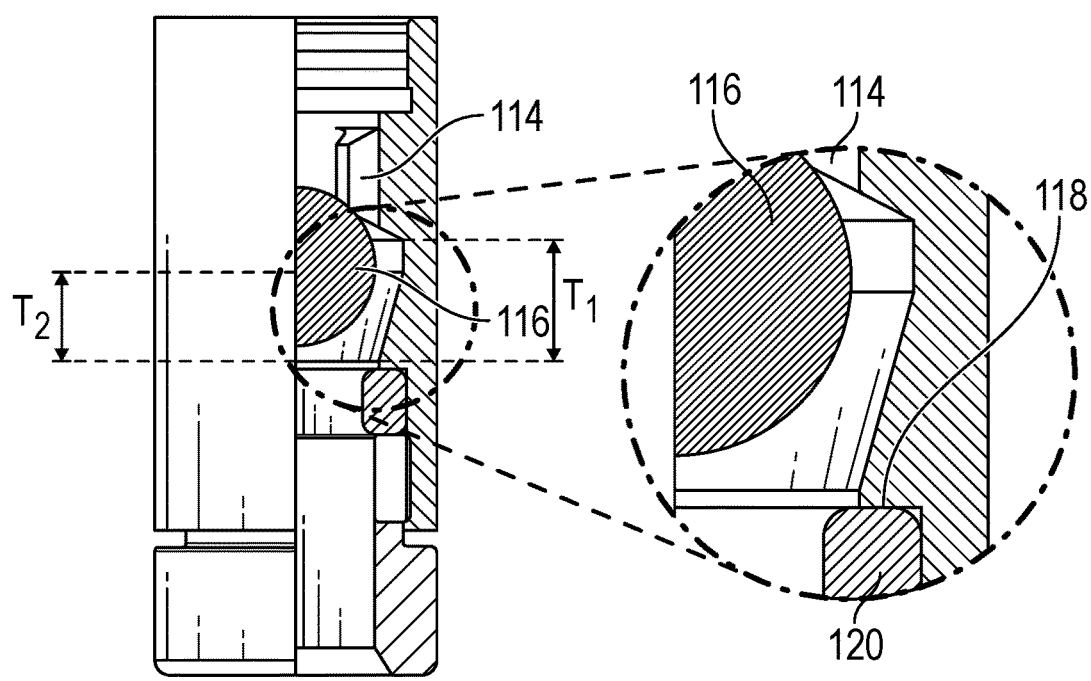
FIG. 5 shows a front quarter-sectioned view of an embodiment of the guideless valve cage with a ball in the open position, with a close-up view of the ball disposed against a ball stop structure.
Figure 6:
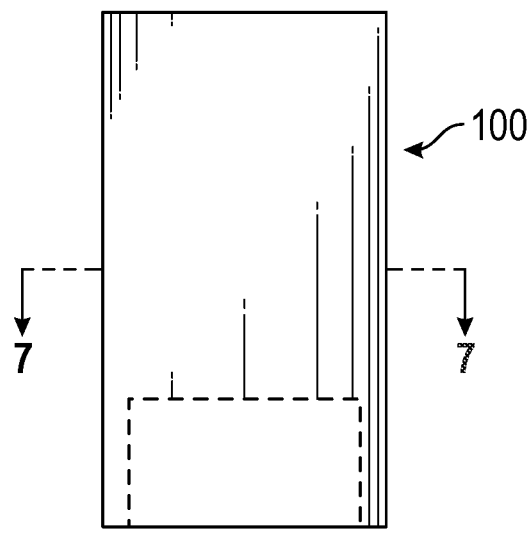
FIG. 6 shows a front view of an embodiment of the disclosed guideless valve gage.

An axial bore 108 extends from the upper end 104 to the lower end 106. The axial bore has an upper section 110 and a lower section 112. A ball stop structure 114 is disposed in the upper section 110. The ball stop structure 114 stops the upward travel of a ball 116 as best shown in FIG. 5 allowing upward flow around the ball, the upward flow existing guideless valve cage 100 through upper end 104. As indicated best in FIG. 3, ball stop structure 114 may comprise three inwardly protruding stop members in a spaced-apart relation. However, the term "ball stop structure" is to be understood to include any structure capable of stopping a generally upward travel of a ball 116.

Figure 4:
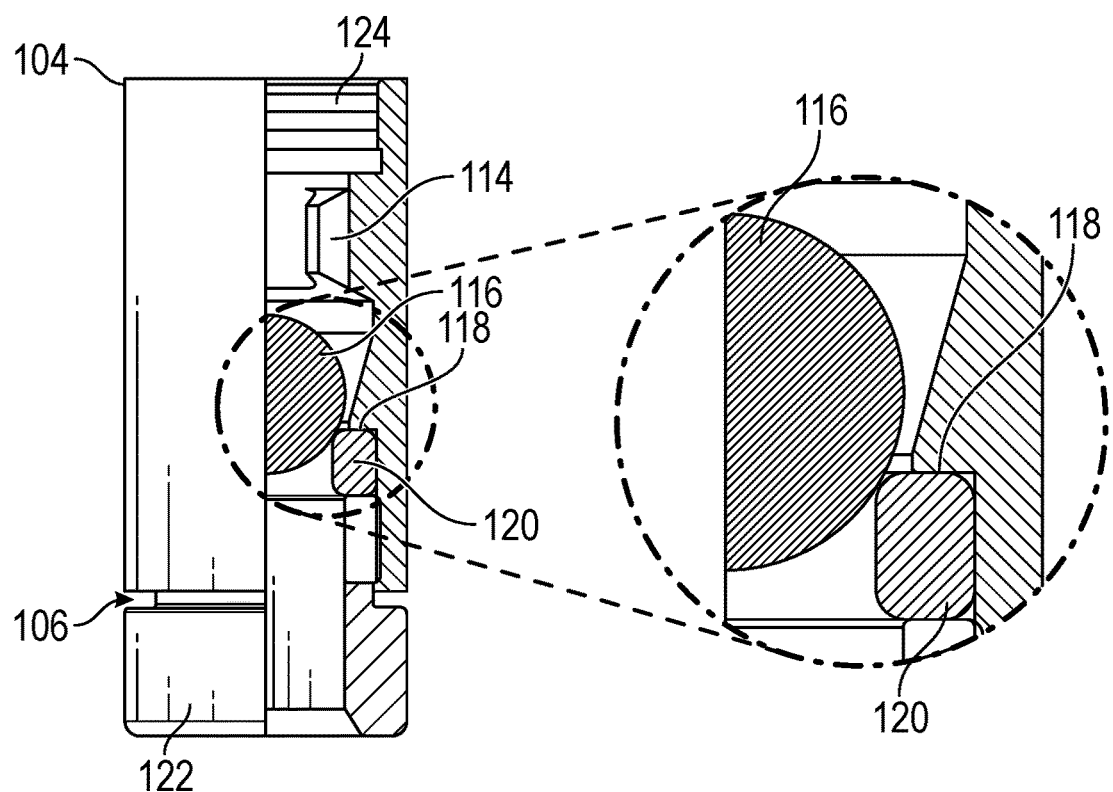
FIG. 4 shows a front quarter-sectioned view of an embodiment of the guideless valve cage with a ball in the closed position, with a close-up view of the ball disposed against a valve seat.

An inwardly facing valve seat shoulder 118 is disposed in the lower section 112. Valve seat shoulder 118 is typically formed as an integral part of axial bore 108. A valve seat 120 may be inserted through lower end 106 until the valve seat abuts valve seat shoulder 118 as best shown in FIG. 4. A seat plug 122 or other structure may be placed within or attached to lower end 106 to secure valve seat 120 in an abutted disposition against valve seat shoulder 118. When downward pressure is applied within guideless valve cage 100, such as when a pump plunger is in an upstroke, ball 116 and valve seat 120 are configured to form a liquid tight seal thereby preventing flow through the lower end 106 of the guideless valve cage 100.

Upper end 104 may have a set of internal threads 124. Likewise, lower end 106 may also have a set of internal threads 126. Conversely, upper end 104 may have external threads. Seat plug 122 or similar structure may have a set of external threads which are configured to make up into internal threads 126 at lower end 106.

Figure 7:
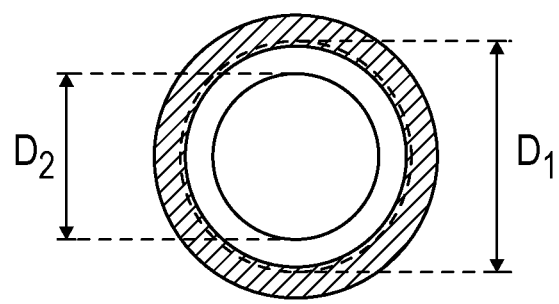
FIG. 7 shows a sectioned view along line 7-7 of FIG. 6.

A ball travel section $T_1$ is defined within the axial bore 108, where the ball travel section extends downwardly from the ball stop structure 114 to the valve seat shoulder 118. The ball travel section has a first diameter $D_1$ which is downwardly adjacent the ball stop structure 114 and a second diameter $D_2$ upwardly adjacent the valve seat shoulder 118, where the first diameter $D_1$ is larger than the second diameter $D_2$ as shown in FIG. 7. A transition section $T_2$ extends from the first diameter $D_1$ to the second diameter $D_2$. As shown in FIG. 5, among other places, transition section $T_2$ has a diameter which decreases linearly between first diameter $D_1$ and second diameter $D_2$.

Operation of the valve is depicted in FIGS. 4 and 5, which exemplify the beneficial configuration of the guideless cage. FIG. 4 shows an embodiment of valve in a closed position with ball 116 sealing against valve seat 120. FIG. 5 shows an embodiment of a valve in an open position with the ball 116 urged upwardly into ball stop structure 114. The figures hereto show a guideless valve cage 100 having a conical profile. This conical profile inhibits ball sticking, reduces ball lift acceleration, eliminates the possibility of chips and debris breaking off from the ball guides, and allows for a full-open flow area through the guideless valve cage 100.

Having thus described the preferred embodiment of the invention, what is claimed as new and desired to be protected by Letters Patent includes the following:

The invention claimed is:

1. A guideless cage for a down-hole valve comprises:
   a cylindrical mandrel having an upper end and a lower end with a longitudinal axis defined there between;
   an axial bore extending from the upper end to the lower end, the axial bore having an upper section and a lower section;
   a ball stop structure disposed in the upper section, the ball stop structure extending radially inward into the axial bore;
   an inwardly facing valve seat shoulder disposed within the lower section; and
   a ball travel section defined within the axial bore, the ball travel section extending downwardly from the ball stop structure to the valve seat shoulder, the ball travel section having a first diameter downwardly adjacent the ball stop structure, a second diameter upwardly adjacent the valve seat shoulder, and a transition section extending between the first diameter and the second diameter, wherein the first diameter is larger than the second diameter and the transition section has a transition diameter which decreases linearly between the first diameter and the second diameter wherein the ball travel section provides a full-open flow area not having an intervening guide.

2. The guideless cage of claim 1 wherein a seat plug is attached to the lower end.

3. The guideless cage of claim 2 wherein a valve seat is disposed between the inwardly facing valve seat shoulder and the seat plug.

4. The guideless cage of claim 3 wherein a ball is disposed in the ball travel section.

5. The guideless cage of claim 4 wherein the upper end comprises a set of internal threads.

6. The guideless cage of claim 5 wherein the lower end comprises a set of internal threads and the seat plug comprises a set of external threads configured to make up into the internal threads of the lower end.

7. The guideless cage of claim 1 wherein the ball stop structure comprises three inwardly protruding stop members disposed in a spaced-apart relationship.

8. A guideless cage for a down-hole valve comprises:
a cylindrical mandrel having an upper end and a lower end with a longitudinal axis defined there between;
an axial bore extending from the upper end to the lower end, the axial bore having an upper section and a lower section;
a ball stop structure disposed in the upper section, the ball stop structure extending radially inward into the axial bore, the ball stop structure comprising a downwardly facing shoulder;
an inwardly facing valve seat shoulder disposed within the lower section; and
a ball travel section defined within the axial bore, the ball travel section extending from the downwardly facing shoulder of the ball stop structure to the inwardly facing valve seat shoulder, the ball travel section comprising a conical profile having a larger diameter downwardly adjacent the ball stop structure and a smaller diameter upwardly adjacent the inwardly facing valve seat shoulder wherein the ball travel section provides a full-open flow area not having an intervening guide.

9. The guideless cage of claim 8 wherein a seat plug is attached to the lower end.

10. The guideless cage of claim 9 wherein a valve seat is disposed between the inwardly facing valve seat shoulder and the seat plug.

11. The guideless cage of claim 8 wherein the upper end comprises a set of internal threads.

12. The guideless cage of claim 9 wherein the lower end comprises a set of internal threads and the seat plug comprises a set of external threads configured to make up into the internal threads of the lower end.

13. The guideless cage of claim 8 wherein the ball stop structure comprises three inwardly protruding stop members disposed in a spaced-apart relationship.

\* \* \* \* \*